United States Patent [19]

Back

[11] 3,708,670
[45] Jan. 2, 1973

[54] PROTECTING STRUCTURE FOR TELEVISION CAMERAS EMPLOYING ZOOM LENSES

[76] Inventor: Frank G. Back, 55 Sea Cliff Avenue, Glen Cove, N.Y. 11542

[22] Filed: Sept. 21, 1970

[21] Appl. No.: 73,846

[52] U.S. Cl....................250/206, 95/10 A, 250/229
[51] Int. Cl................................................H01j 39/12
[58] Field of Search.....250/206, 229; 95/53 E, 64 D, 95/10, 10 A, 10 PO; 350/17, 266, 269, 273, 275, 205, 206; 178/7.2

[56] References Cited

UNITED STATES PATENTS

| | | |
|---|---|---|
| 2,976,758 | 3/1961 | Parker...................................350/269 |
| 2,403,730 | 7/1946 | MacNeille...........................350/275 |
| 3,275,831 | 9/1966 | Martin..................................350/266 |
| 3,389,259 | 6/1968 | Zarem...................................350/269 |
| 3,548,197 | 12/1970 | Nordmann............................350/269 |
| 3,127,809 | 4/1964 | Denk.................................95/10 PO |
| 3,170,159 | 2/1965 | Goldberg..........................95/10 PO |
| 3,451,324 | 6/1969 | Miyauchi...........................95/10 PO |

*Primary Examiner*—Archie R. Borchelt
*Assistant Examiner*—D. C. Nelms
*Attorney*—Albert F. Kronman

[57] ABSTRACT

The photosensitive elements of television cameras equipped with zoom lenses are protected by a combined beam splitter and photocell arrangement which activates a shutter in the event of excessive light entering the lens. The apparatus will operate in all zoom positions of the lens.

4 Claims, 1 Drawing Figure

PATENTED JAN 2 1973 3,708,670
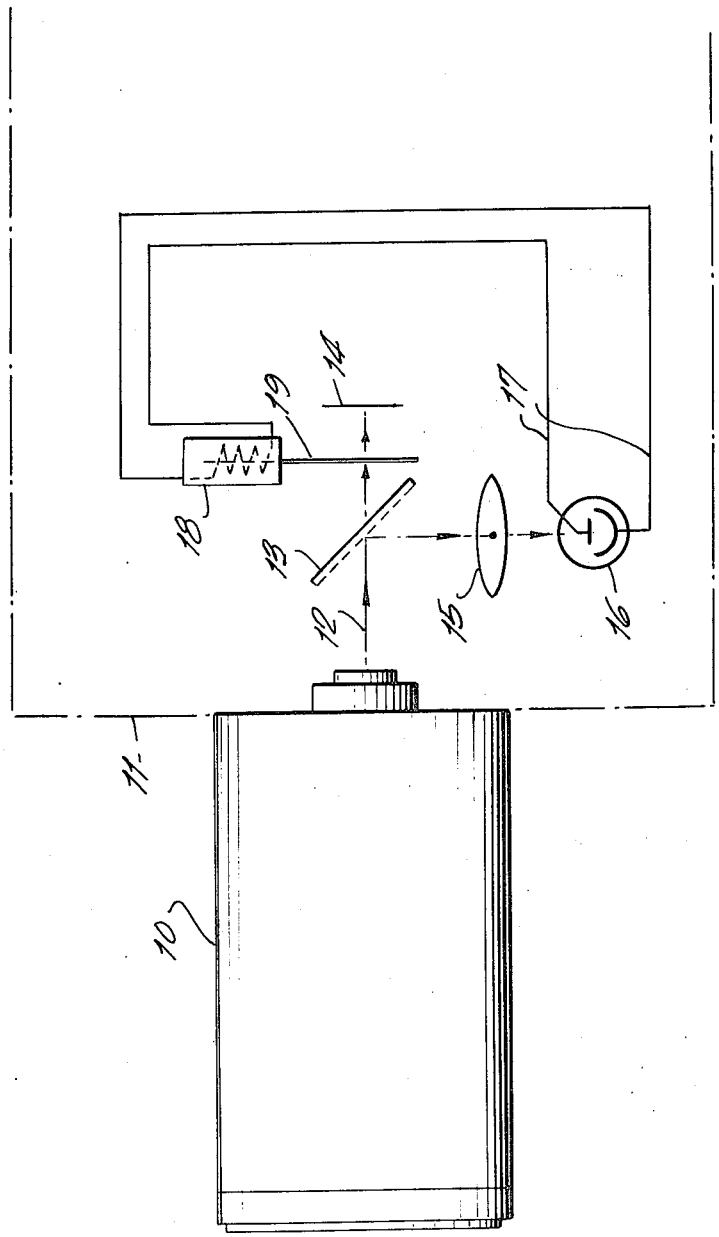
INVENTOR.
FRANK G. BACK
ATTORNEY

PROTECTING STRUCTURE FOR TELEVISION CAMERAS EMPLOYING ZOOM LENSES

BACKGROUND OF THE DISCLOSURE

Television cameras are often rendered inoperative by reason of pointing the camera at the sun or some other source of high intensity illumination. This problem is made more difficult when a varifocal or zoom lens is attached to the camera. Since a zoom lens may be in the wide angle or telephoto position or any position in between at the time of the exposure to excessive light, it is difficult to provide protective devices for the camera. One suggested means of achieving this protection is to provide three separate light sensing devices one for each extreme of the zoom lens no matter what the position of the zoom lens at the time. The apparatus is simple and lends itself to installation with the camera to be protected.

SUMMARY OF THE INVENTION

In the present invention, a beam splitter, partially silvered mirror or pellicle is placed at an angle adjacent the exit end of a zoom lens so that a portion of the light coming through the zoom lens is reflected through a field lens and into a photocell. The photocell is connected to a shutter which swings into place across the light path coming from the zoom lens into the camera. The photocell is actuated by excessive light coming through the lens.

DESCRIPTION OF THE DRAWINGS

The accompanying drawing forming a part hereof, illustrates diagrammatically a complete embodiment of the present invention.

GENERAL DESCRIPTION

Referring to the drawing, 10 indicates a varifocal lens, hereinafter referred to as a zoom lens, secured to a television camera 11 (indicated in dashed lines).

Light indicated by dashed lines 12 coming from the exit pupil of the zoom lens 10 is directed at a pellicle or partially silvered mirror 13, which is interposed between the zoom lens 10 and the film plane 14 of the camera. The semi-silvered mirror 13 preferably reflects less than 10 percent of the light incident thereon and transmits the remainder to the film plane 14 of the camera. The reflected component of the light is directed downwardly by reason of the angular disposition of the mirror 13 through a field lens 15 and into a photo-electric cell 16. The photo-electric cell 16 is operatively connected by leads 17 to a shutter actuator 18, which may be a solenoid or similar device. The solenoid 18 serves to swing a leaf shutter 19 across the path of the light traversing mirror 13 in the event that excessive light is directed through the zoom lens 10.

The amount of light which will trigger the solenoid 18 can be regulated by means well known in the electronic art so that permitted amounts of light will not cause the solenoid to operate.

Since light coming from the zoom lens in accordance with the present invention has a constant exit pupil, the position of the zoom lens element whether in the wide angle or telephoto or any intermediate position, will not interfere with the operation of the protective device. In addition, as will be seen from the drawing, the distance from the partially silvered mirror 13 to the field lens 15 is equal to the distance from the mirror 13 to the film plane 14 within the camera. In this manner, light intensities reaching the film plane 14 can not exceed the amount of light which will trigger the photocell 16 and cause the shutter 19 to be swung into place. As shown in the drawing the field lens 15 is substantially larger than the film plane 14 of the television camera so that no excessive light can reach the film plane without first triggering the photocell 16.

Having thus fully described the invention, what is claimed as new and desired to be secured by Letters Patent of the United States, is:

1. A camera protecting device for cameras employing zoom lenses comprising a beam splitter to receive light coming from the exit pupil of the zoom lens, said beam splitter dividing the light incident thereon into a reflected component and a transmitted component, a film plane within the camera to receive the transmitted light component from the beam splitter, a field lens to receive the reflected component from the beam splitter, a photo-electric cell to receive the light coming through the field lens and shutter means disposed in back of the beam splitter operatively coupled to the photo-cell for interrupting the transmitted component of light in the event that the reflected component directed into the photo-cell exceeds permitted limits.

2. A device according to claim 1 in which the beam splitter is a pellicle which reflects less than 10 percent of the light incident thereon.

3. A device according to claim 1 in which the shutter actuating mechanism includes a solenoid.

4. A device according to claim 1 in which the field lens is substantially larger than the film plane.

* * * * *